US011916852B1

(12) United States Patent
Smith et al.

(10) Patent No.: US 11,916,852 B1
(45) Date of Patent: *Feb. 27, 2024

(54) OPEN CONVERSATION USER INTERFACE

(71) Applicant: UIPCO, LLC, San Antonio, TX (US)

(72) Inventors: Ian Smith, San Antonio, TX (US); Jeremy Mark Fisher, San Antonio, TX (US); Heather Hernandez, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,728

(22) Filed: May 6, 2022

Related U.S. Application Data

(63) Continuation of application No. 17/157,553, filed on Jan. 25, 2021, now Pat. No. 11,349,785, which is a continuation of application No. 16/815,839, filed on Mar. 11, 2020, now Pat. No. 10,938,753, which is a continuation of application No. 15/373,265, filed on Dec. 8, 2016, now Pat. No. 10,630,613.

(60) Provisional application No. 62/266,409, filed on Dec. 11, 2015.

(51) Int. Cl.
*H04L 12/58* (2006.01)
*H04L 51/02* (2022.01)
*H04L 67/568* (2022.01)
*G06F 3/0482* (2013.01)

(52) U.S. Cl.
CPC ............ *H04L 51/02* (2013.01); *H04L 67/568* (2022.05); *G06F 3/0482* (2013.01)

(58) Field of Classification Search
CPC ... H04L 51/02; H04L 67/2842; H04L 67/568; G06F 3/0482
See application file for complete search history.

(56) References Cited

U.S. PATENT DOCUMENTS

| | | | |
|---|---|---|---|
| 2009/0037306 A1* | 2/2009 | Hill | G06Q 40/00 705/35 |
| 2009/0245500 A1* | 10/2009 | Wampler | H04M 7/006 379/265.09 |
| 2010/0125592 A1* | 5/2010 | Dauginas | G06Q 30/02 707/E17.014 |
| 2010/0159883 A1* | 6/2010 | Pascal | G06F 16/245 455/466 |
| 2011/0202347 A1* | 8/2011 | Moore | H04L 65/1104 704/260 |
| 2012/0016678 A1* | 1/2012 | Gruber | G06F 40/279 704/E21.001 |
| 2012/0072440 A1* | 3/2012 | Vasquez | G06Q 30/0615 709/227 |
| 2013/0007137 A1* | 1/2013 | Azzam | H04L 51/216 709/206 |
| 2013/0346886 A1* | 12/2013 | Cauchois | H04L 51/046 715/758 |

(Continued)

*Primary Examiner* — Chris Parry
*Assistant Examiner* — Hassan A Khan
(74) *Attorney, Agent, or Firm* — Locke Lord LLP; Christopher J. Capelli

(57) ABSTRACT

Disclosed are systems and methods for conducting an open conversation user interface and more particularly, to a channel-agnostic user interface experience which can utilize automated background intelligence to simplify the exchange between a software system or member service representative (MSR) and a member, and avoids the need for web-based free form inputs.

20 Claims, 16 Drawing Sheets

(56) References Cited

U.S. PATENT DOCUMENTS

| | | | |
|---|---|---|---|
| 2014/0022328 A1* | 1/2014 | Gechter | G06Q 30/06 |
| | | | 348/14.02 |
| 2014/0136506 A1* | 5/2014 | Ratner | G06Q 30/0256 |
| | | | 707/706 |
| 2014/0164502 A1* | 6/2014 | Khodorenko | H04M 3/5191 |
| | | | 709/204 |
| 2014/0195621 A1* | 7/2014 | Rao Dv | H04L 12/1827 |
| | | | 709/206 |
| 2015/0006143 A1* | 1/2015 | Skiba | G06F 40/263 |
| | | | 704/2 |
| 2015/0227941 A1* | 8/2015 | Tuchman | H04M 3/5183 |
| | | | 705/7.14 |
| 2015/0324900 A1* | 11/2015 | Starikova | G06F 3/04842 |
| | | | 705/35 |
| 2015/0324904 A1* | 11/2015 | Starikova | G06Q 30/00 |
| | | | 705/35 |
| 2015/0347900 A1* | 12/2015 | Bell | G06N 5/02 |
| | | | 706/11 |
| 2016/0036649 A1* | 2/2016 | Kansky | G06F 3/04847 |
| | | | 715/752 |
| 2016/0036869 A1* | 2/2016 | Logan | H04L 51/046 |
| | | | 379/265.09 |
| 2016/0065738 A1* | 3/2016 | Schwartz | G06Q 30/016 |
| | | | 379/265.03 |
| 2016/0226978 A1* | 8/2016 | Logan | H04L 63/08 |
| 2016/0295018 A1* | 10/2016 | Loftus | H04M 3/5175 |
| 2017/0011383 A1* | 1/2017 | Melzer | G06Q 20/02 |
| 2017/0195262 A1* | 7/2017 | Vityaz | H04L 51/04 |
| 2017/0324868 A1 | 11/2017 | Tamblyn et al. | |
| 2018/0367483 A1 | 12/2018 | Rodriguez et al. | |

\* cited by examiner

OPEN CONVERSATION USER INTERFACE

CROSS REFERENCE TO RELATED APPLICATIONS

This application is a Continuation of U.S. patent application Ser. No. 17/157,553 filed Jan. 25, 2021, which is a is a Continuation of U.S. patent application Ser. No. 16/815,839 filed Mar. 11, 2020, which is a Continuation of U.S. patent application Ser. No. 15/373,265 filed Dec. 8, 2016, which claims priority to U.S. Patent Application Ser. No. 62/266,409 filed Dec. 11, 2015, which are incorporated herein by reference in their entirety.

FIELD OF THE INVENTION

The disclosed embodiments generally relate to an open conversation user interface and more particularly, to a channel-agnostic user interface experience which can utilize automated background intelligence to simplify the exchange between a software system or member service representative (MSR) and a member, and avoids the need for web-based free form inputs.

BACKGROUND OF THE INVENTION

Often when a customer or member is visiting a company's application or website, a need arises for the customer or member to complete a transaction or task, or for online customer support from a customer services representative or member services representative (MSR). In some instances the customer may simply need to perform a simple service-related transaction, or have a single question answered. However, the customer may also need to have several related questions answered and would like to have a dialog with a customer support representative without having to pick up the phone and call the representative.

One prior user interface system which has been developed for exchanging information between a customer and an MSR is a chat box which can be accessed by clicking on the appropriate icon on the webpage. Once that is done, a chat dialog is opened, which can be modal or modalless and may be displayed with the dialog or outside of the client application. However, conducting the interaction between the two parties in a chat box format requires cumbersome, natural-language-based, free-form inputs from both parties and does not afford the customer the ability to go back and change prior responses.

Moreover, in prior art user (e.g. member/MSR) interface systems, each customer/member and MSR channel looks and functions differently and these systems are not capable of utilizing background intelligence that may have been obtained from prior chats, interactions or communications exchanged between the parties.

There is a need therefore, for a seamless and consistent user experience across all channels and input/output methods. Moreover, there is a need for an open conversation user interface which can utilize automated background intelligence to simplify the exchange between the software system or an MSR and a member and avoids the need for web-based free form inputs.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method for providing an open conversation user interface on a client computing device is disclosed. In a representative embodiment of the method a client initiates over a network connection an open conversation user interface between a member service representative and the client on the client computing device. The client imputes a conversation topic and using the open conversation user interface a series of exchanges are initiated between the client and the member services representative which relate to a conversation topic. Each exchange in the series of exchanges between the member services representative and the client is displayed at least partially on a graphical user interface associated with the client computing device. Based on at least one prior exchange in the conversation and previously collected background intelligence data a next inquiry to be made with the client is determined and displayed on the graphical user interface. The client inputs a response to the inquiry thereby completing the exchange; wherein the response to the inquiry is displayed on the graphical user interface; and it is determined if further exchanges between the member services representative and the client are required.

In a representative embodiment, the step of determining based on at least one prior exchange in the conversation and the background intelligence data a next inquiry to be made with the client is conducted in an automated mode. Alternatively, the step of determining based on at least one prior exchange in the conversation and the background intelligence data a next inquiry to be made with the client can be conducted manually by the member services representative.

In certain embodiments, checkboxes, radio buttons or links can be displayed for use by the client in responding to inquiries from the member services representative.

Preferably, the system enables modification by the client of a response to an exchange between the member services representative and the client which has been displayed on the graphical user interface.

It is envisioned that the automated background intelligence data can include remotely stored cached data. In certain embodiments, the cached data includes at least one of: account data, geographical data, historical data, and familial data. Moreover, the background intelligence data can include indexed prior conversations between the client and a member services representative. For example, the background intelligence data can include information relating to prior chats, interactions or communications exchanged between the client and a member services representative.

Various methods can be employed by the client for imputing information or data such as by touch, voice, clicking or free form input methods.

Preferably, an embodiment of the disclosed method for providing an open conversation user interface on a client computing device allows the client to initiate a chat, a voice call, a video call or email communication with the member services representative.

In certain embodiments of the present disclosure, a dialog between the client and the member services representative can be initiated when the client has been idle or inactive for a predetermined period of time.

It is envisioned that location or motion detection can be utilized to determine if the client has downtime. Moreover, optical character recognition can be used to autocomplete any inputting performed by the client.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
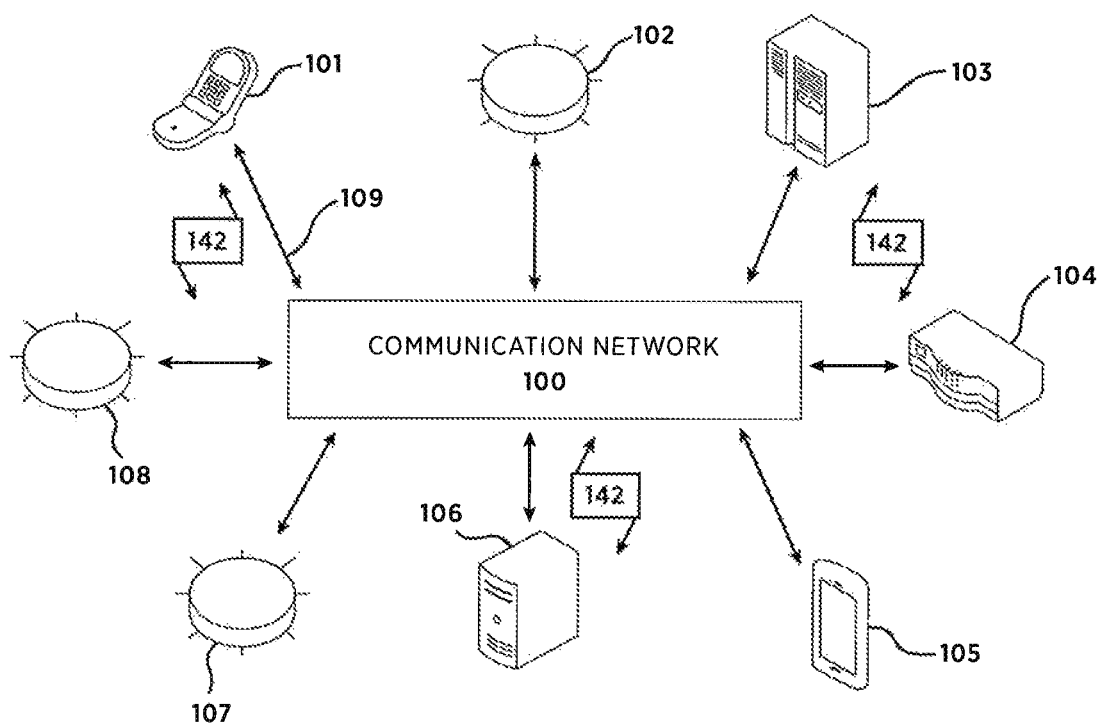
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Any publications discussed herein are provided solely for their disclosure prior to the filing date of the present application. Nothing herein is to be construed as an admission that the illustrated embodiments are not entitled to antedate such publication by virtue of prior invention. Further, the dates of publication provided may differ from the actual publication dates which may need to be independently confirmed.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
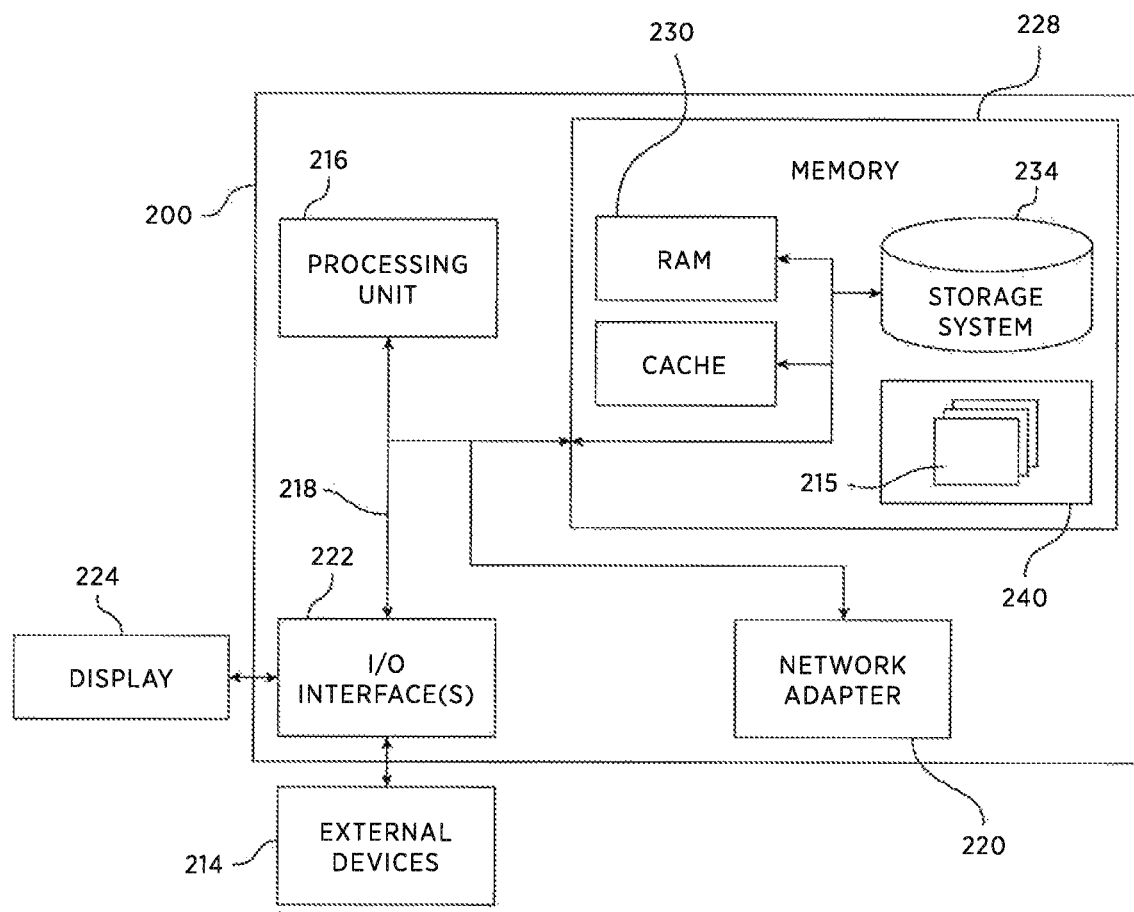
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as open conversation user interface module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

It is to be further appreciated; embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary communication network 100 (FIG. 1) and computing device 200 (FIG. 2) being generally shown and discussed above, description of certain illustrated embodiments of the present invention will now be provided.

Figure 3:
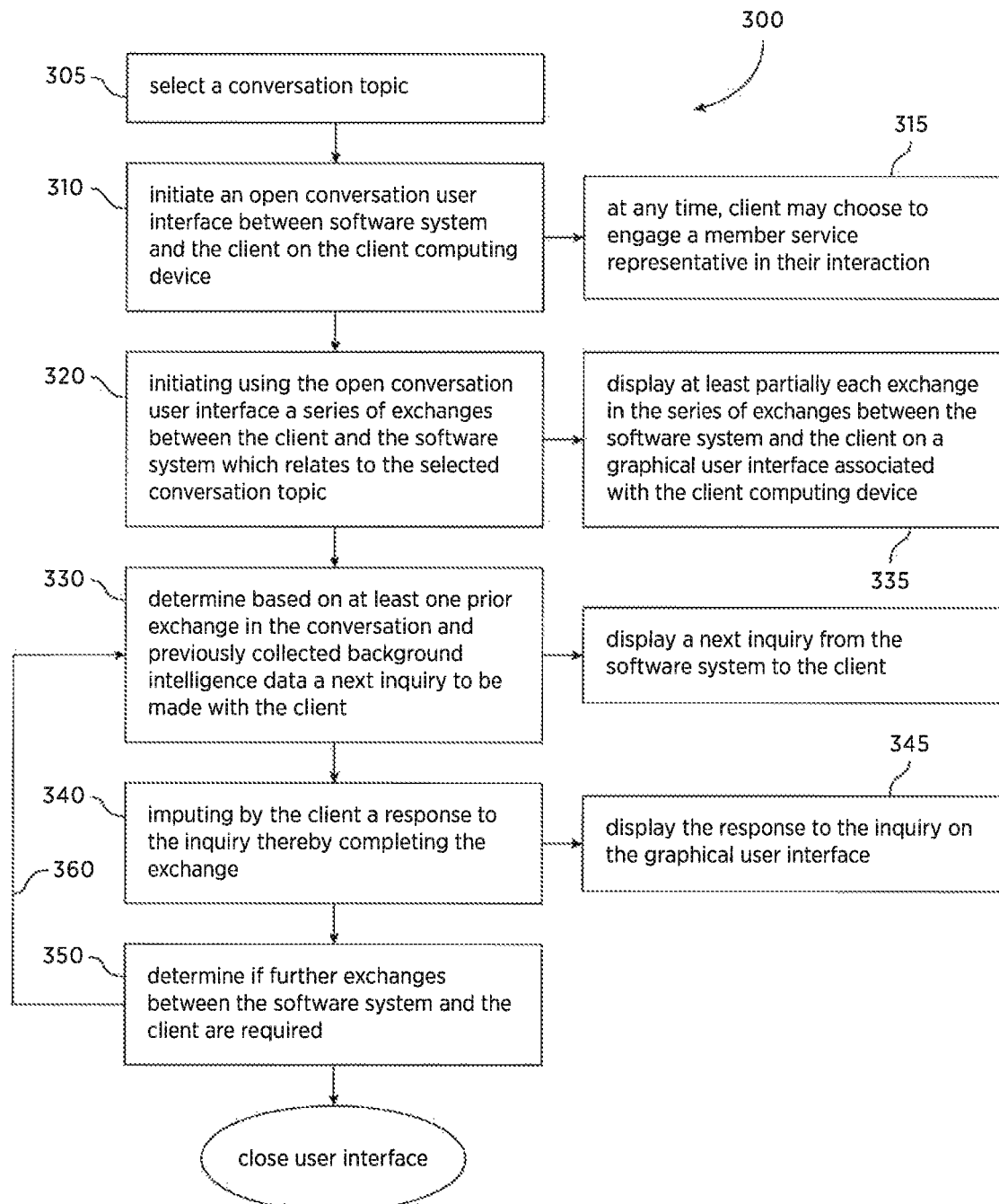
FIG. 3 is a block diagram depicting a representative method for providing an open conversation user interface on a client computing device.
Figure 4A:
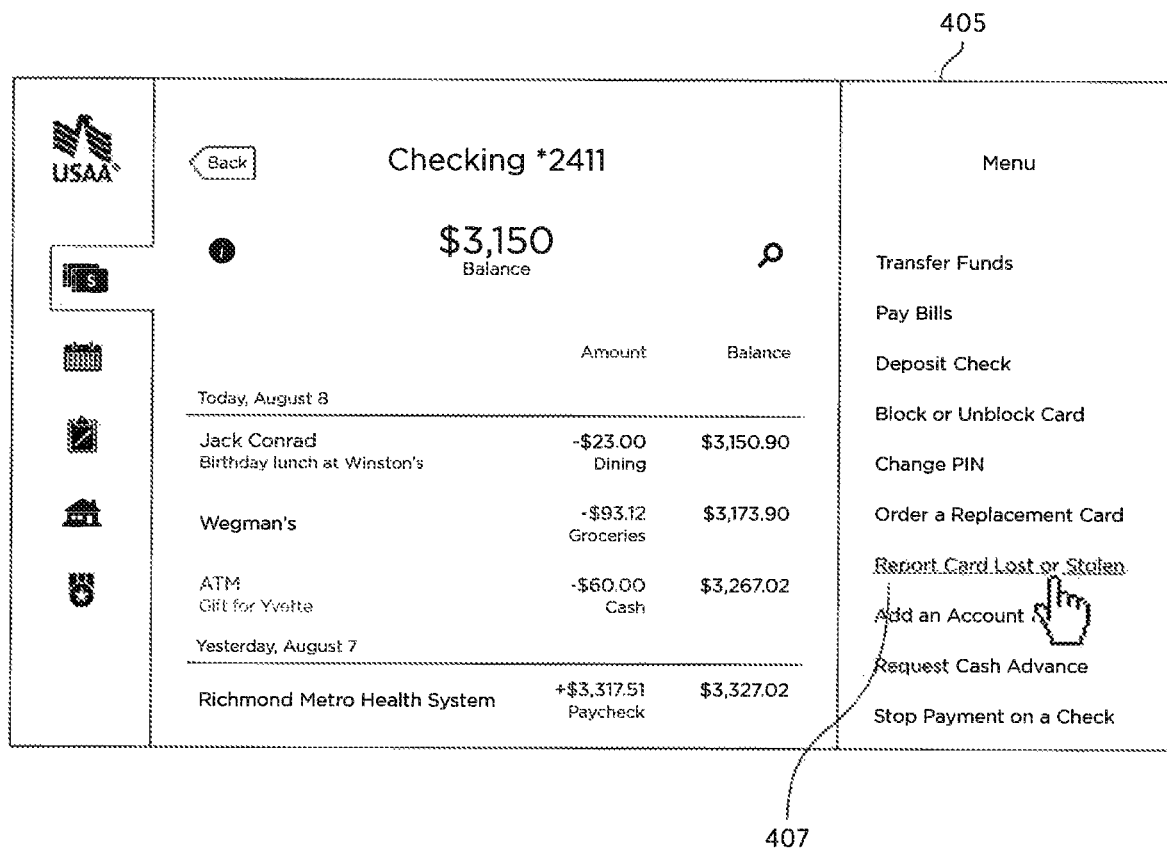
FIGS. 4A-4E illustrate screen shots of an open conversation user interface application.
Figure 4B:
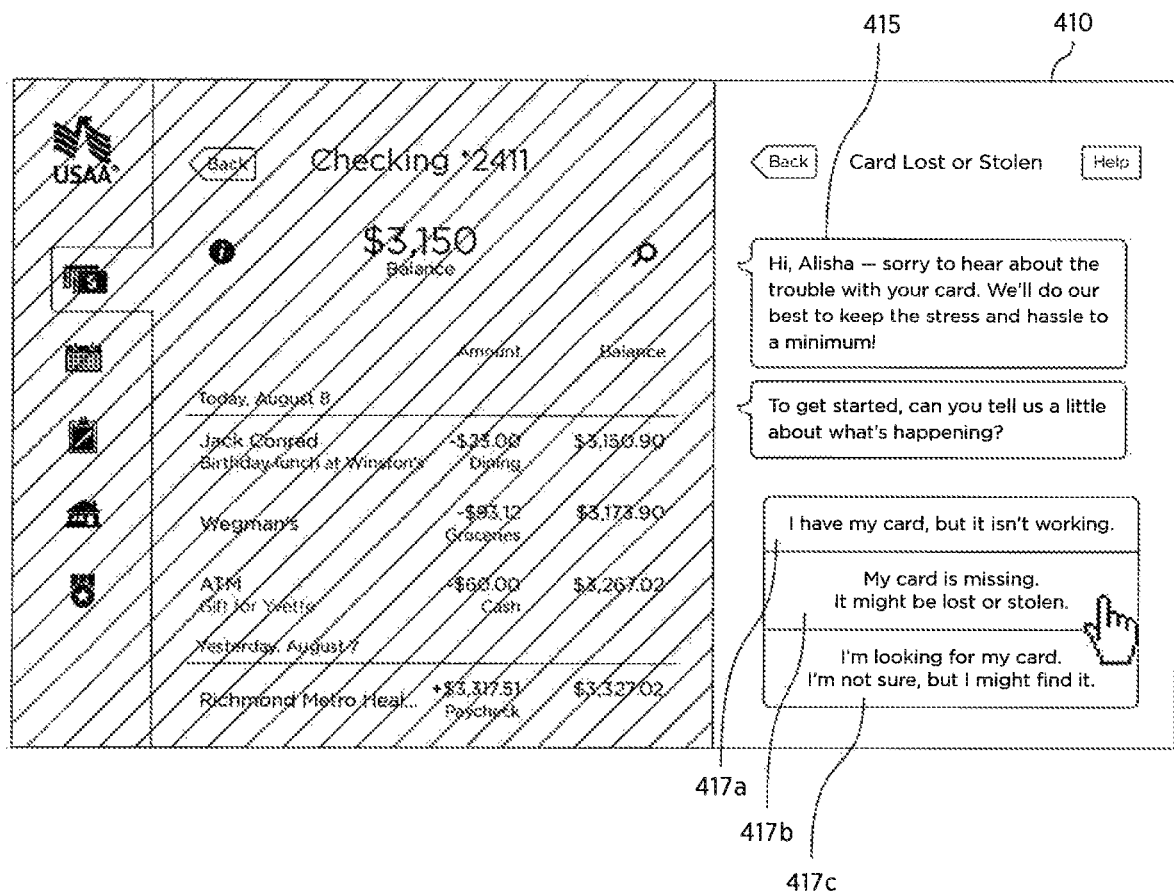
Figure 4C:
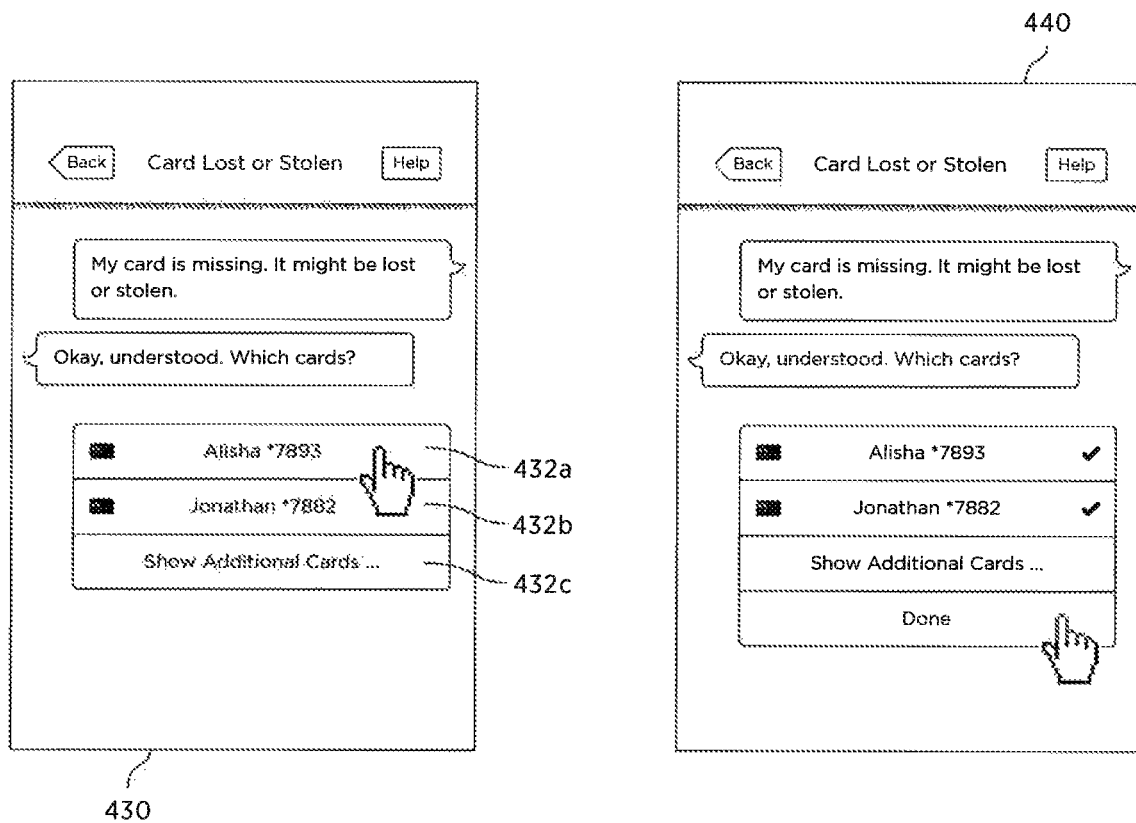
Figure 4D:
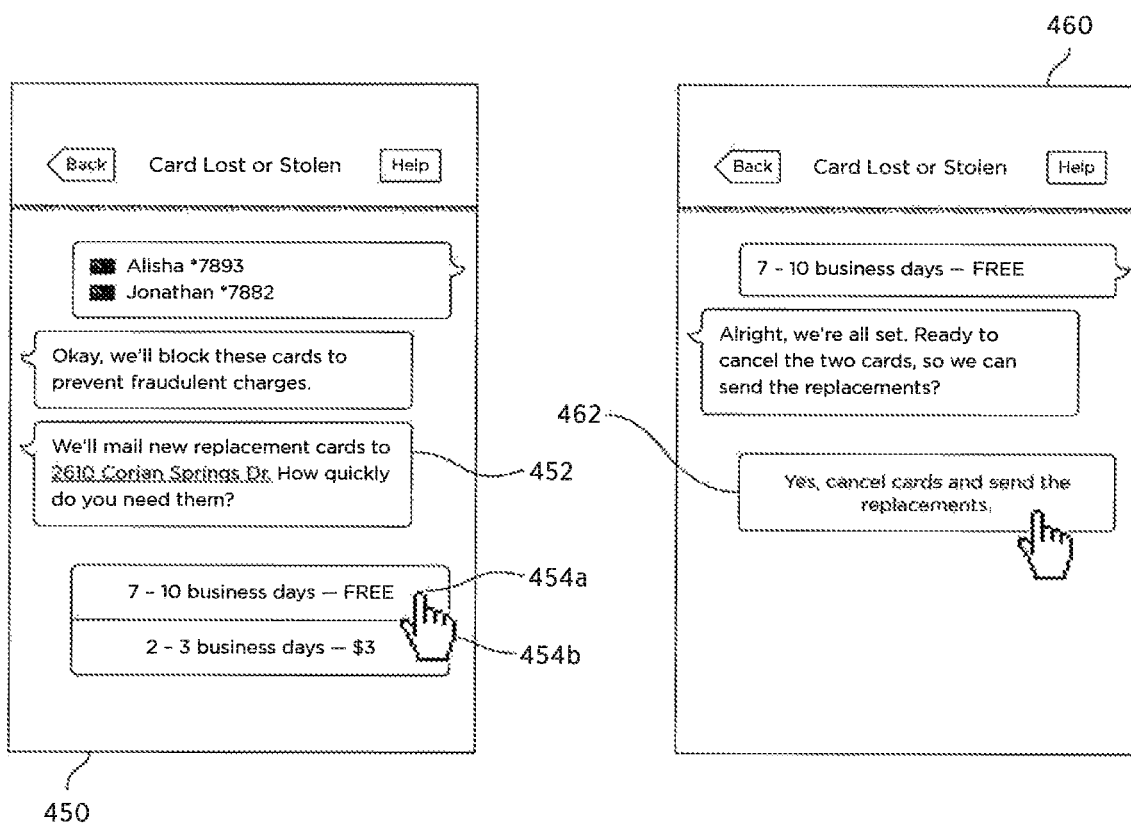
Figure 4E:
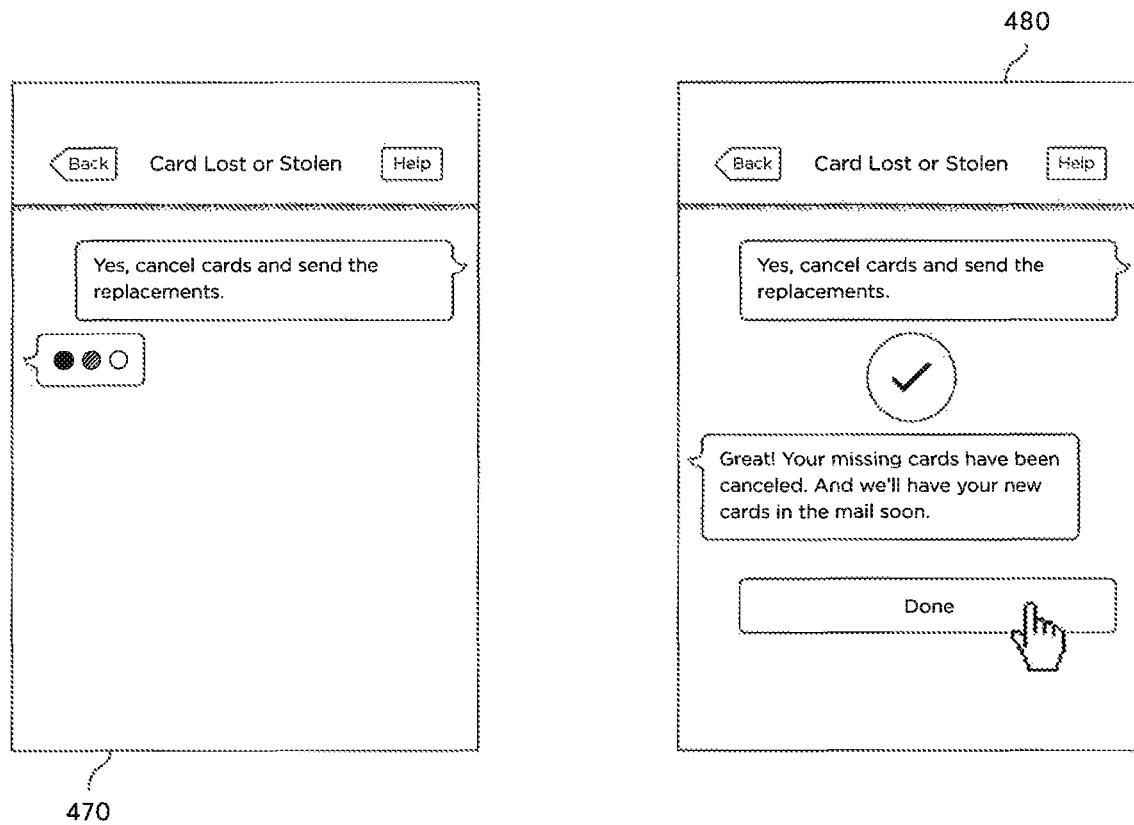
Figure 5A:
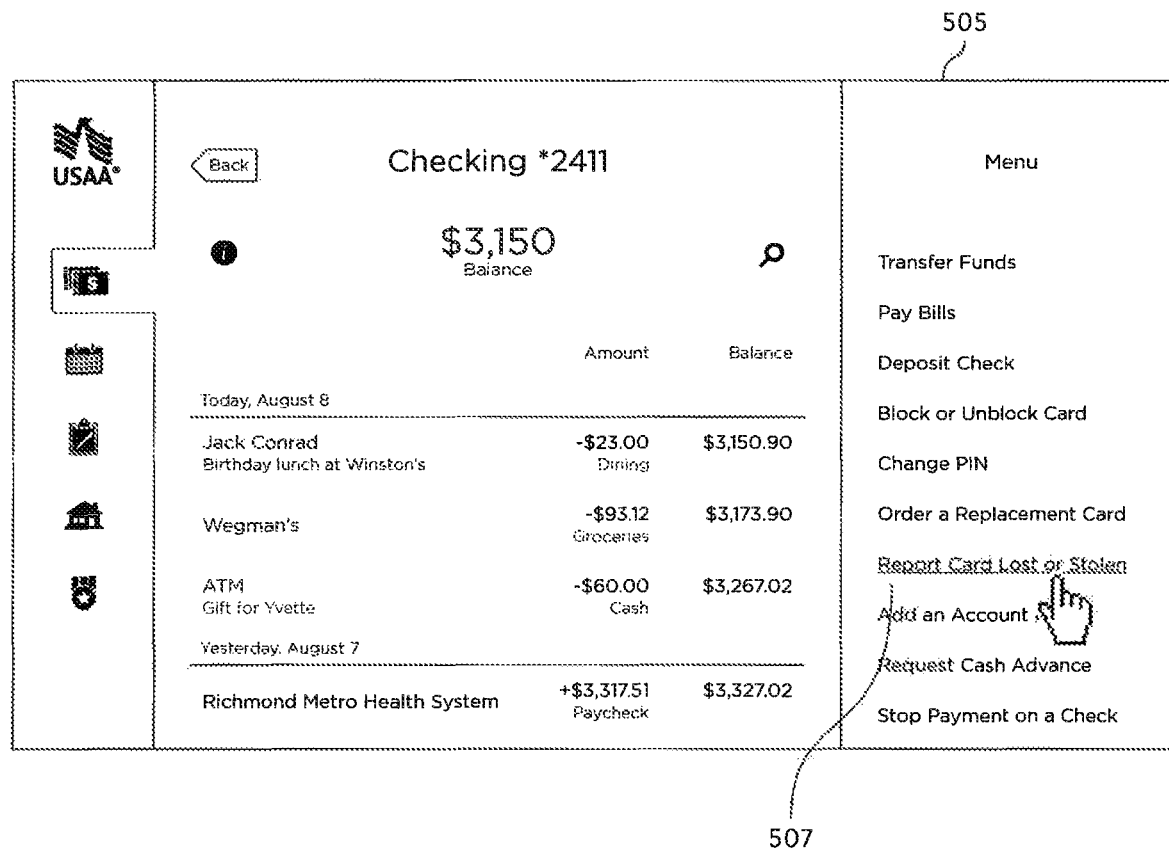
FIGS. 5A-5H illustrate screen shots of an open conversation user interface application in which a member services representative chat is invoked.
Figure 5B:
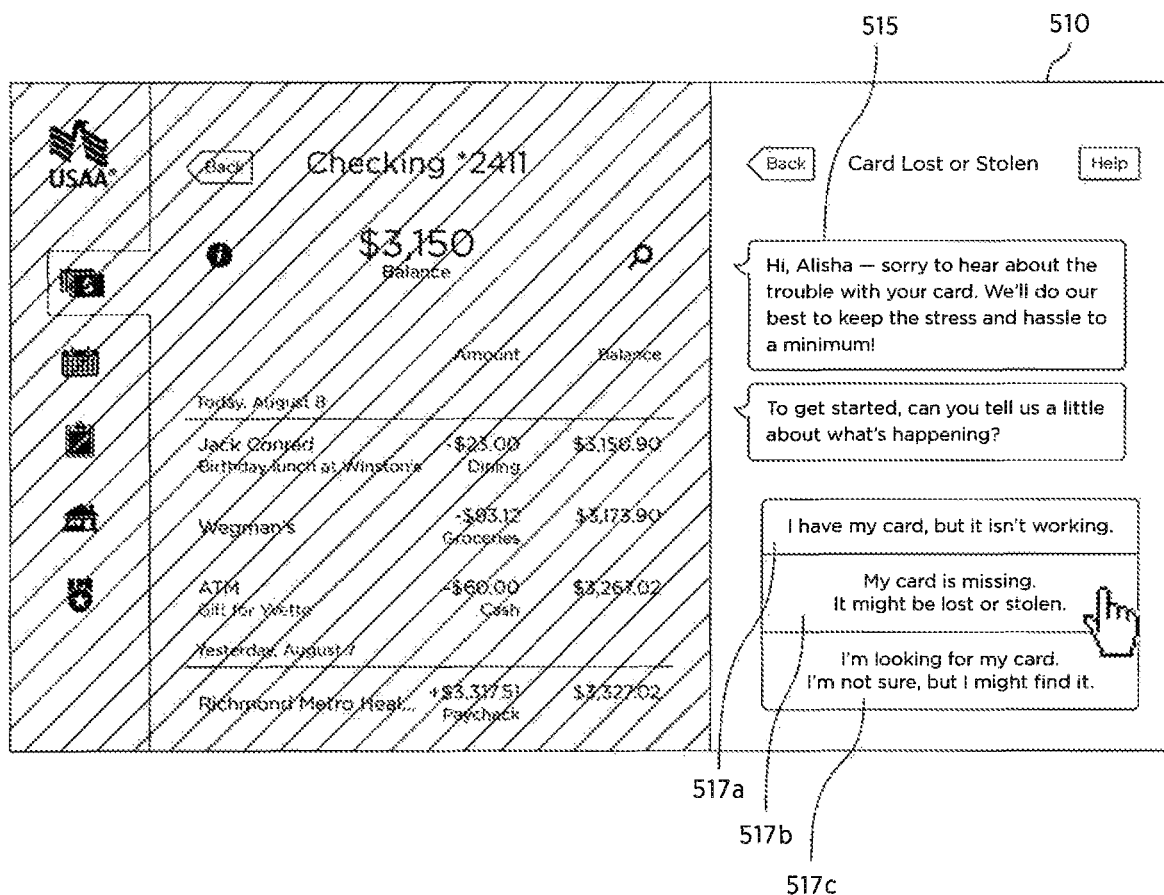
Figure 5C:
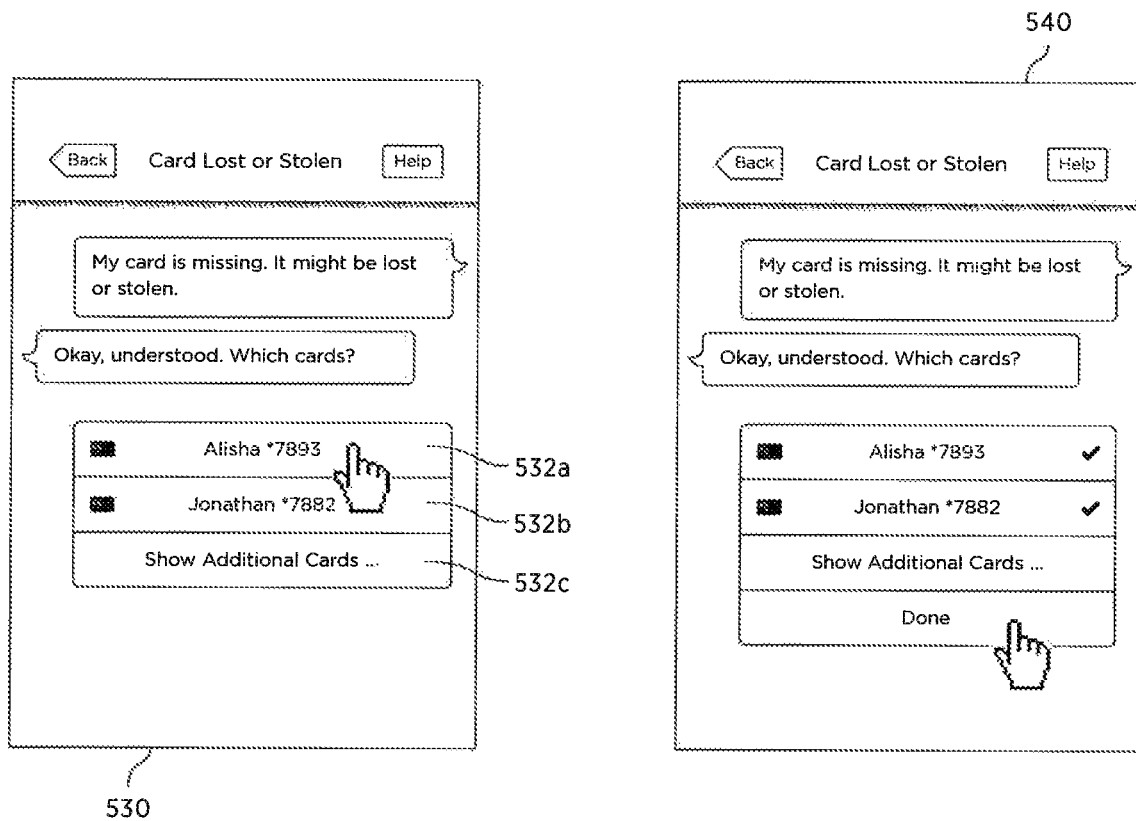
Figure 5D:
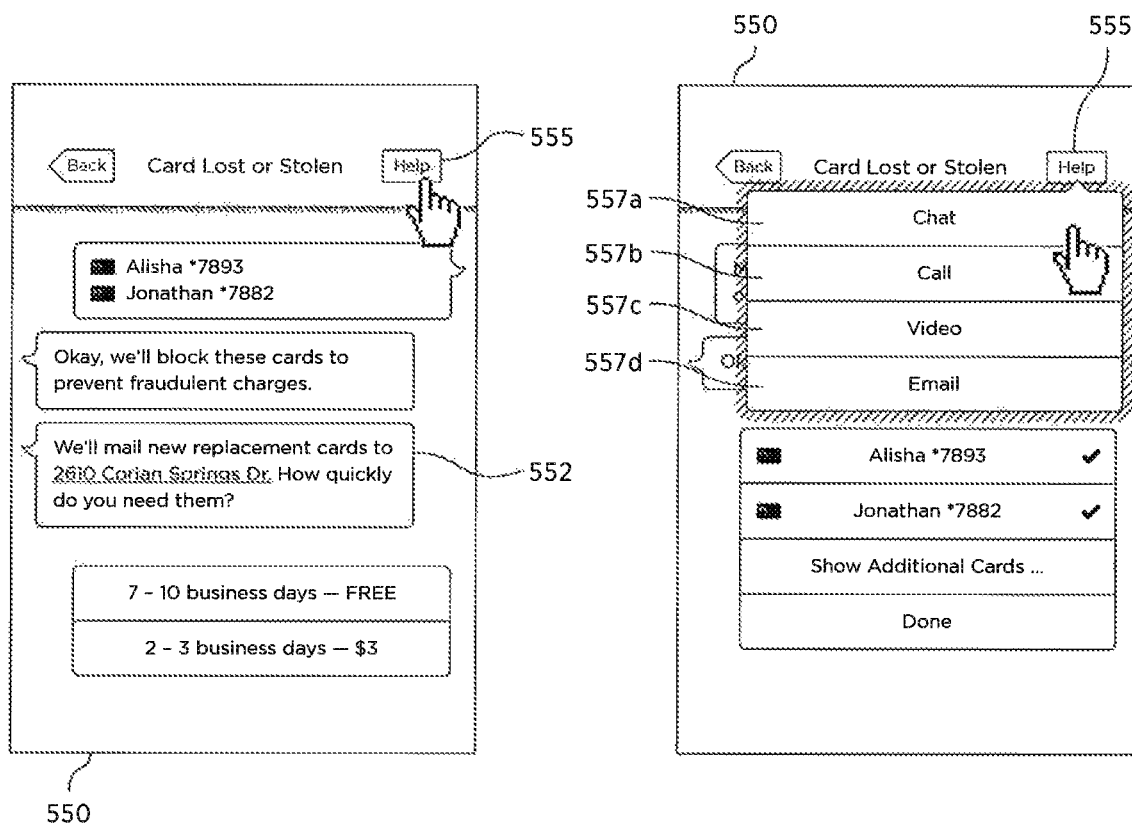
Figure 5E:
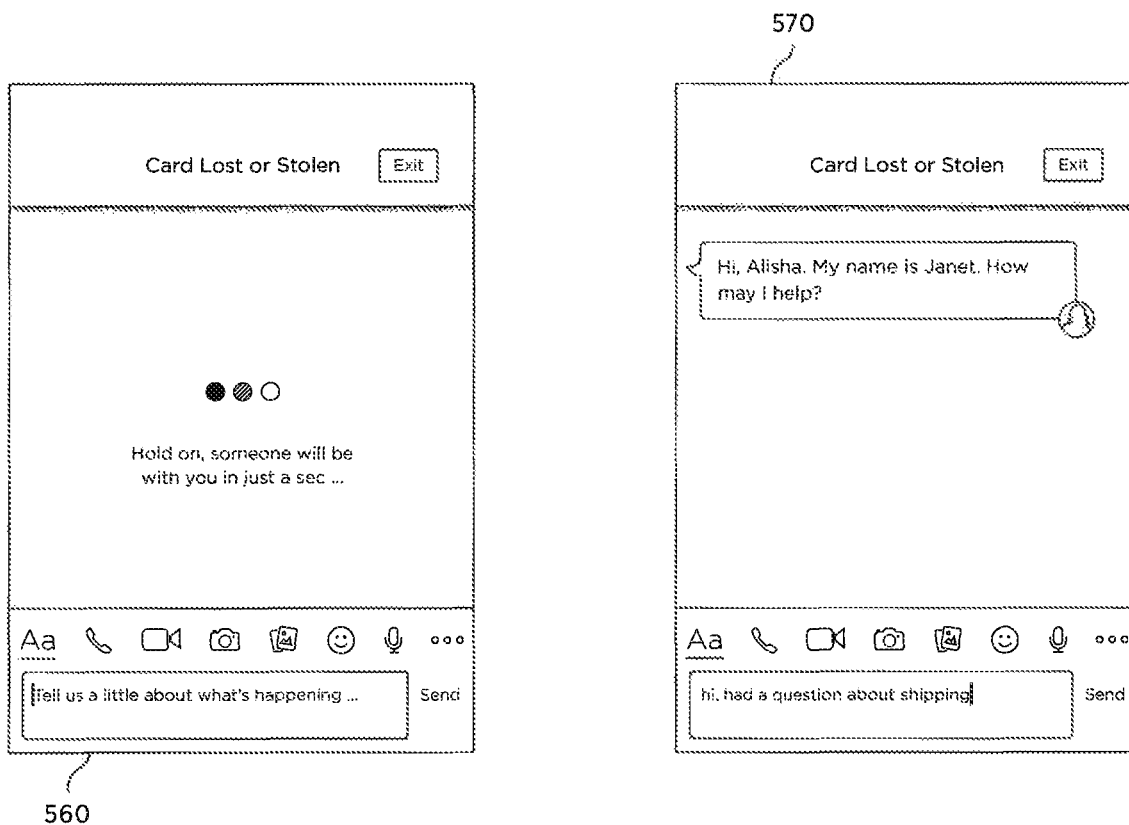
Figure 5F:
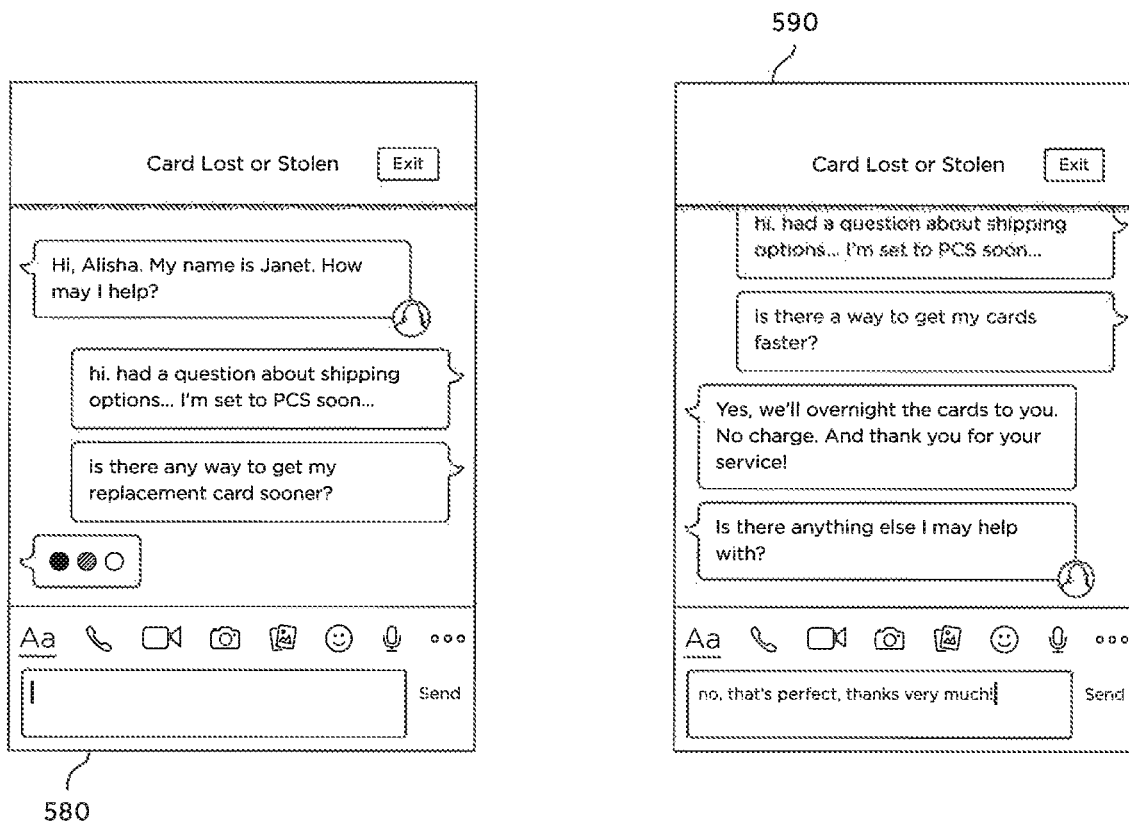
Figure 5G:
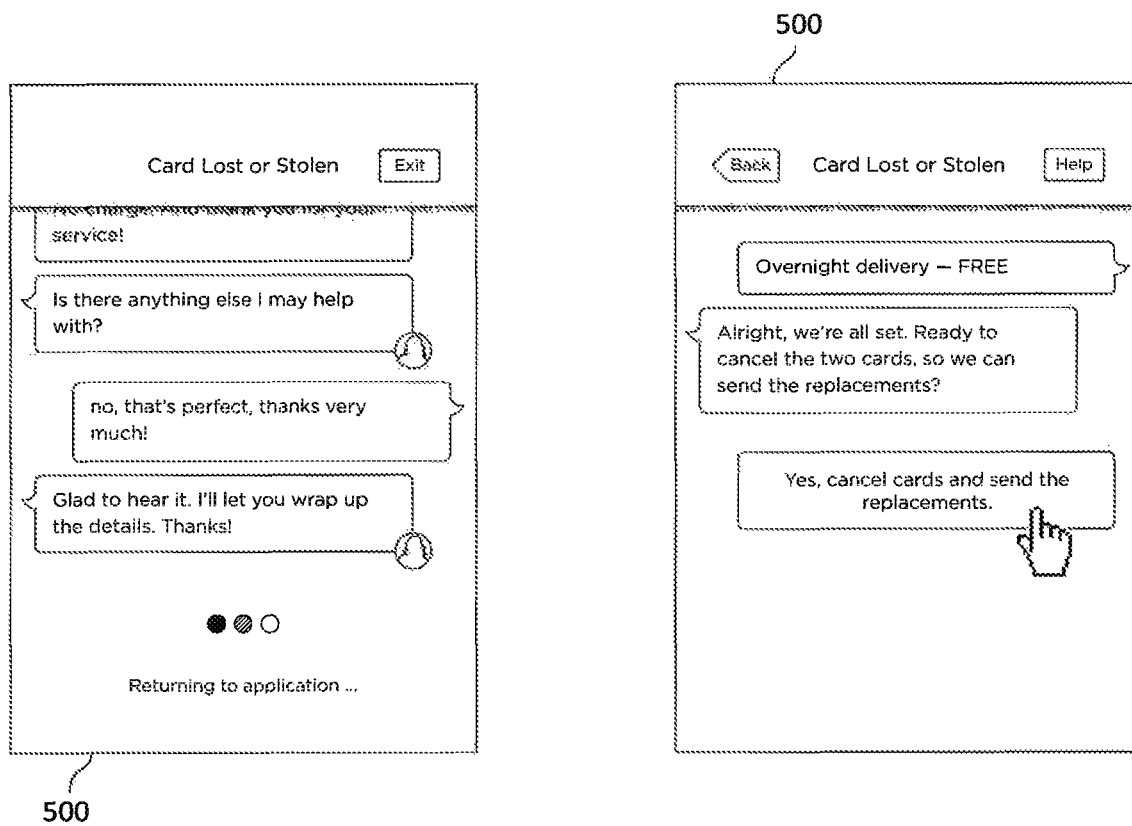
Figure 5H:
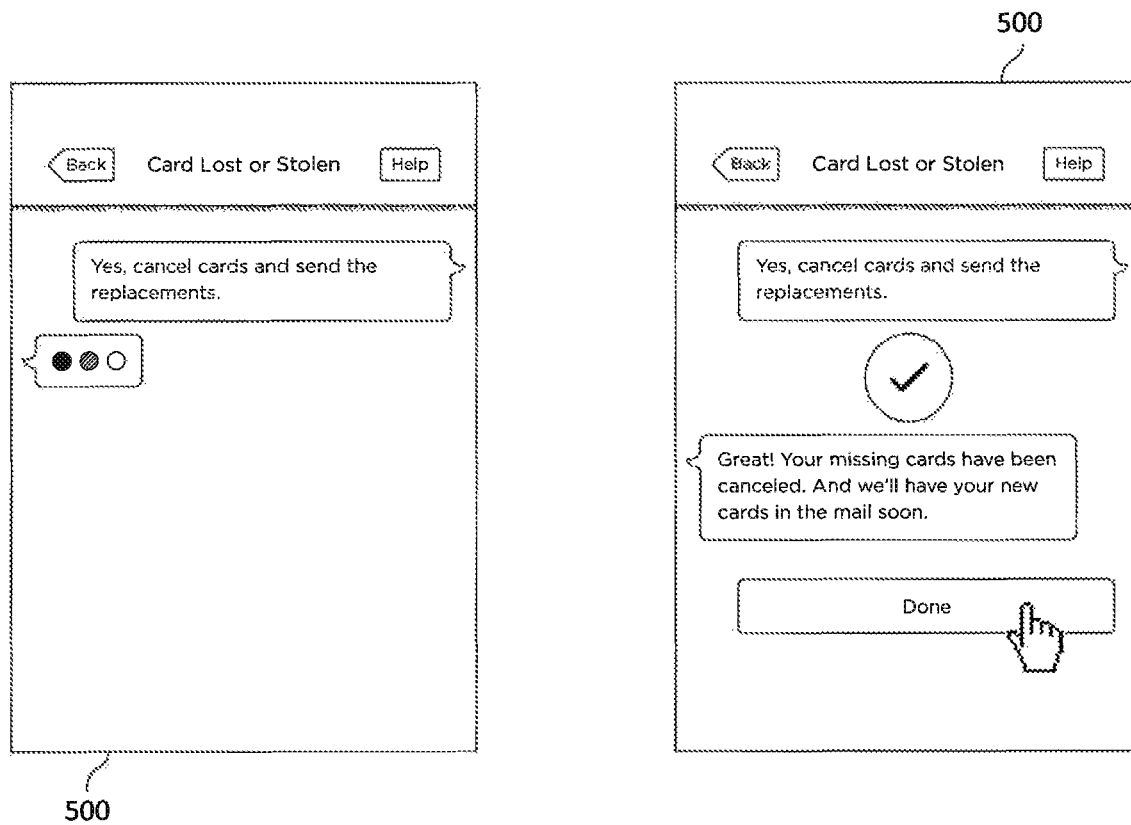

With reference now to FIG. 3, shown is a flow chart demonstrating implementation of an exemplary embodiment. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

FIG. 3 illustrates a method 300 for providing an open conversation user interface on a client computing device. For a variety of reasons a client may need assistance from a member services representative. For example, when conducting online banking the client may need assistance with performing a balance transfer or possible cancelling lost or stolen credit cards. The open conversation user interface disclosed herein allows the client to interact with an MSR in a seemingly conversational manner.

Typically, as shown in step 310 a client initiates an open conversation user interface over a network connection between a member service representative (MSR) and the client on the client computing device. The initiation can be performed in a variety of ways. For example, the initiation can be performed actively by the client selecting or clicking on an icon shown on the webpage being visited or on the application interface. Alternatively, the initiation can be implemented automatically when it is determined that the client has been idle and may need assistance.

At step 315, the client imputes a conversation topic, such as "lost or stolen credit card". As discussed previously, a variety of methods can be used for inputting, selecting or identifying what topic the client would like to discuss with the MSR.

At step 320, using the open conversation user interface a series of exchanges are conducted between the client and the member services representative which relate to the conversation topic.

Each exchange in the series of exchanges between the member services representative and the client is displayed at least partially step 325 on a graphical user interface associated with the client computing device. FIGS. 4 and 5, which will be discussed below, each provide a sample exchange using the open conversation user interface of the present disclosure.

Based on at least one prior exchange in the conversation and previously collected background intelligence data a next inquiry to be made with the client is determined at step 330 and displayed at 335 on the graphical user interface. The display steps 325/335/345 are shown on the right margin of FIG. 3 because as noted above, the exchange information displayed will remain at least partially visible while open conversation user interface 300 is active.

At step 340, the client inputs a response to the inquiry thereby completing the exchange; wherein the response to the inquiry is displayed on the graphical user interface at step 345.

After an exchange is complete, at step 350 it is determined if further exchanges between the member services representative and the client are required. If further exchanges are required, then the user proceeds back to step 330 and a further determination of a next inquiry is made. If no further exchanges are required the user interface is closed and deactivated. If the client desires a further "conversation" related to a different conversation topic, the client can reinitiate the user interface.

As noticed above, the step 330 of determining a next inquiry to be made with the client based on at least one prior exchange in the conversation and the background intelligence data is conducted in an automated mode. For example, a series of inquiries can be stored for specific potential client conversation topics and therefore, a script can be automatically followed by the system for the series of exchanges with the client.

Alternatively, the step 330 of determining the next inquiry to be made with the client can be conducted manually by the member services representative. The MSR can manually insert the next inquiry to be made or select an inquiry from a list of possible inquiries.

As will be discussed with reference to FIGS. 4A-E and 5A-5H, the user interface 300 can include checkboxes, radio buttons or links for use by the client in responding to inquiries from the member services representative. Moreover, the interface 300 enables modification by the client of a prior response to an exchange between the member services representative and the client which is displayed on the graphical user interface.

The automated background intelligence data can include remotely stored cached data. In certain embodiments, the cached data includes at least one of: account data, geographical data, historical data, and familial data. Moreover, the background intelligence data can include indexed prior conversations between the client and a member services representative. For example, the background intelligence data can include information relating to prior chats, interactions or communications exchanged between the client and a member services representative.

As will be described below, various methods can be employed by the client for imputing information or data such as by touch, voice, clicking or free form input methods. For example, as will be described with reference to FIG. 5, the interface can allow the client to initiate a chat, a voice call, a video call or email communication with the member services representative.

Referring now to FIGS. 4A-4E which provides an exemplary embodiment of an open conversation 500 between a client and an MSR using client-centric API user interface 300. As shown in screen shot 410, a client is accessing a backing application or website and has initiated an open conversation with an MSR and indicated she is having trouble with her banking card. As a result, user interface system 300 either automatically or manually through action of the MSR puts forth an initial inquiry in dialog view 415 to the client requesting the client provide more specifics relating to card issue. At this point the client can select a response from three choices provided on buttons 417a-c.

As shown in dialog view 420, the client has indicated that her card is missing and that it may be lost or stolen. As a result, the system determines based on the client's response and based on background data a next question to ask the client, which is presented in dialog view 430. In this instance the background data relates to account data representing the cards the client has associated with the account. The client can select one or both of the two cards listed on buttons 432a or 432b, respectively, or alternatively the client can select the button 432c, and request additional cards to be shown.

Dialog box 440 indicates that the client has selected both cards and a check mark in provided next to each abbreviated card identification number. After the client clicks on the "done" button, the interface proceeds to dialog box 450. In dialog box 450 the MSR interface indicates that the selected cards will be blocked to prevent fraudulent charges. The dialog box 450 also includes an indication 452 of where the replacement cards will be sent and the address listed is obtained from stored background information. The next inquiry to the client relates to how quickly the client wants to receive the replacement cards. As shown in dialog box 460, the client has selected to receive the replacement cards in 7-10 business days by clicking on button 454a. The client then confirms to the MSR that the cards should be cancelled and replacements sent by clicking on button 462 and proceeding to dialog box 470. In box 480 t receipt is confirmed of the client's instructions and the client deactivates the user interface by selecting the "done" button.

Referring now to FIGS. 5A-5H, which represents an open conversation 500 between an MSR and a client using interface 300. Conversation 500 is similar to the one previously described with reference to FIG. 4. Like before, in screen shot 510, a client is accessing a banking application or website and has initiated a conversation-style interaction to indicate she is having trouble with her banking card. As a result, user interface system 300 either automatically or manually through action of the MSR puts forth an initial inquiry in dialog view 515 to the client requesting the client provide more specifics relating to card issue. At this point the client can select a response from three choices provided on buttons 517a-c.

As shown in dialog view 520, the client has indicated that her card is missing and that it may be lost or stolen. As a result, the system determines based on the client's response and based on background data a next question to ask the client, which is presented in dialog view 530. In this instance the background data relates to account data representing the cards the client has associated with the account. The client can select one or both of the two cards listed on buttons 532a or 532b, respectively, or alternatively the client can select the button 532c, and request additional cards to be shown.

Dialog box 540 indicates that the client has selected both cards and a check mark in provided next to each abbreviated card identification number. After the client clicks on the "done" button, the interface proceeds to dialog box 550. In dialog box 550 the interface indicates that the selected cards will be blocked to prevent fraudulent charges. The dialog box 550 also includes an indication 552 of where the replacement cards will be sent and the address listed is obtained from stored background information. The next inquiry to the client relates to how quickly the client wants to receive the replacement cards.

Unlike in the previously describe conversation 400 in FIGS. 4A-4E, in conversation 500, the client selects the help button 555. As a result, the client is presented with 4 options; initiate a chat (button 557d), a call (button 557d), a video call (button 557d) or email exchange (button 557d) with the MSR. At that point the system can switch from an automatic mode to an MSR manual mode and connect the client with an MSR in using the desired method of interaction. As shown in dialog boxes 560 and 570, the client has elected to initiate a chat with the MSR. It should be appreciated that after the chat session the system can be switched back into an automated mode. It also should be appreciated that a chat, video, voice or email dialog between the client and the member services representative can be initiated without the client having to select the help button for example, when the client has been idle or inactive for a predetermined period of time.

As will be appreciated, the above described user interface is capable of providing a seamless user experience across all channel types. The user interface is a channel-agnostic experience that is centered around conversations instead of more robotic web-based form inputs and represents a simplified interface for touch/click user interface components. The user interface can combine checkboxes, radios, buttons, and links together in the dialog boxes, and the user sees them as conversational options. The architecture can be designed to keep the conversational content present on the screen and previous answers are partially shown to indicate that the prior questions are still accessible.

The user interface works on all channels and can target any user-interface type (web, native app, interactive voice, etc.). More importantly, the concept of form-style pages is gone and a running history of inputs is provided with the ability to go back and change answers without consequence. Moreover, the system is robust with advanced error prevention because of chained linear input display rules and can seamlessly switch between touch, voice, video and automated or non-automated systems. In spite of channel switching, the interactive state is maintained—such as if started on voice, then switched to touch; the client progress would be at the same spot in the conversation or exchange.

The interface system can also be adapted to allow sharing between multiple users in different locations. For example, multiple members of a household can participate in the conversational interaction.

In certain embodiments, the MSR can control the application on the client's behalf. Moreover, the MSR mode may have a distinct user interface to show what they are capturing.

The interface system provides automated flow versus trying to control user interface inputs and page location, and allows the client to fall back to traditional forms of input if desired. The system could also be provided with video or audio electronic signature functionality. The system could also look at trending times for engagement, such as Saturday afternoons, and use this data to encourage re-engagements or reminders to the client. Moreover, the system can use contextual knowledge to auto-fill or verify knowledge already known (i.e., it is known where the client goes every day for home to work, know that the client has a particular preferred car dealer, etc.).

Importantly, the system provides seamless switching between automated and non-automated interactions, is client-centric API driven and its enhanced architecture provides scalability to integrate into future channels such as voice through audio I/O link to fridge, watch, TV, car, VR, large touch-screen, etc. Moreover, the system allows clients to save and return and come back to the exact interactive state without having to fully sanitize and save all inputs to the traditional database.

A benefit of the disclosed system is that MSR notes are collected for every experience and exchange with a client. This would allow the system to learn over time what real members/clients/MSRs are saying and adjust the automated system accordingly. Free-form input on full MSR mode could help inform the automated system. Life events could be documented by MSRs and captured for systems to learn. The system can be adapted to automatically log life events in the background.

A further advantage is that MSRs could be pooled and view simultaneous chat threads and jump in or out, based on availability, experience, and expertise. Mute-and-transcribe ability can be added for the MSR side of the interface. The system could utilize speech recognition to autocomplete based upon what the member is saying, to allow MSR to focus on conversation or side-actions instead of manually typing out information or filling out interactive forms.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. An automated method for providing a conversation interface on a client computing device when a client is interacting with a company application, comprising:
    providing a conversation interface on the client computing device responsive to a conversation topic relating to the client's interaction with the company application, wherein the conversation interface includes a request for information by the client in a series of conversational exchanges between the client and automated responses from the company application;
    inputting, by the client, information into the conversation interface responsive to the request for information in the series of conversational exchanges;
    enabling, via the conversation interface, the client to modify one or more prior conversational responses displayed in the conversation interface provided by the client associated with prior conversational exchanges made by the client;
    determining, and displaying to a company representative, an inquiry to be made by the company representative with the client relating to the information inputted by the client associated with the series of conversational exchanges; and
    inputting, by the client, information into the conversation interface responsive to the inquiry by the company representative thereby completing the client's information conversational exchange with the conversation interface.

2. The method as recited in claim 1, further including displaying the conversational response to the inquiry in the conversation interface on the client computing device.

3. The method as recited in claim 1, wherein the inquiry to be made by the company representative is based on at least one prior client conversational exchange in the conversation interface and previously collected background data associated with a note entered by the company representative relating to the at least one prior client conversational exchange.

4. The method as recited in claim 3, further including determining if further conversational exchanges between the company representative and the client are required.

5. The method as recited in claim 4, wherein determining a next inquiry to be made with the client based on at least one prior client conversational exchange in the conversation interface and the previously collected background data is conducted in an automated mode.

6. The method as recited in claim 3, wherein determining a next inquiry to be made with the client based on at least one prior client conversational exchange in the conversation interface and the previously collected background data is conducted manually by the company representative.

7. The method as recited in claim 3, further comprising displaying checkboxes, radio buttons or link for use by the client in the conversation interface in responding to an inquiry from the company representative.

8. The method as recited in claim 3, further comprising enabling modification by the client of a response to a conversational exchange between the company representative and the client which has been displayed on a graphical user interface.

9. The method as recited in claim 3, wherein the previously collected background data includes indexed prior conversational exchanges between the client and the company representative.

10. The method as recited in claim 3, wherein the previously collected background data includes information relating to prior chats, interactions or communications exchanged between the client and the company representative.

11. A computer system for automatically providing a conversation interface on a client computing device when a client is interacting with a company application, comprising:
    a memory for storing instructions coupled to a processor, wherein the processor upon execution of the instructions is configured to:
        provide a conversation interface on the client computing device responsive to a conversation topic relating to the client's interaction with the company application, wherein the conversation interface includes a request for information by the client in a series of conversational exchanges between the client and automated responses from the company application;
        enable input, by the client, of information into the conversation interface responsive to the request for information in the series of conversational exchanges;
        enable, via the conversation interface, the client to modify one or more prior conversational responses displayed in the conversation interface provided by the client associated with prior conversational exchanges made by the client;

determine, and display to a company representative, an inquiry to be made by the company representative with the client relating to the information inputted by the client associated with the series of conversational exchanges; and enable input, by the client, of information into the conversation interface responsive to the inquiry by the company representative thereby completing the client's information conversational exchange with the conversation interface.

12. The computer system as recited in claim 11, wherein the processor is further configured to display the conversational response to the inquiry in the conversation interface on the client computing device.

13. The computer system recited in claim 12, wherein the inquiry to be made by the company representative is based on at least one prior client conversational exchange in the conversation interface and previously collected background data associated with a note entered by the company representative relating to the at least one prior client conversational exchange.

14. The computer system as recited in claim 13, wherein the processor is further configured to determine if further conversational exchanges between the company representative and the client are required.

15. The computer system as recited in claim 13, wherein determining a next inquiry to be made with the client based on at least one prior client conversational exchange in the conversation interface and the previously collected background data is conducted in an automated mode.

16. The computer system as recited in claim 13, wherein determining a next inquiry to be made with the client based on at least one prior client conversational exchange in the conversation interface and the previously collected background data is conducted manually by the company representative.

17. The computer system as recited in claim 13, wherein the processor is further configured to display checkboxes, radio buttons or link for use by the client in the conversation interface in responding to an inquiry from the company representative.

18. The computer system as recited in claim 13, wherein the processor is further configured to enable modification by the client of a conversational response to a conversational exchange between the company representative and the client which has been displayed on a graphical user interface.

19. The computer system as recited in claim 13, wherein the previously collected background data includes indexed prior conversational exchanges between the client and the company representative.

20. The computer system as recited in claim 13, wherein the previously collected background data includes information relating to prior chats, interactions or communications exchanged between the client and the company representative.

* * * * *